US012607717B2

(12) United States Patent　　　(10) Patent No.:　US 12,607,717 B2
Morinaka　　　　　　　　　　　　　(45) Date of Patent:　Apr. 21, 2026

(54) METHOD OF ADJUSTING RADIO WAVE SENSOR, PROCESSING DEVICE, AND COMPUTER PROGRAM

(71) Applicant: SUMITOMO ELECTRIC INDUSTRIES, LTD., Osaka (JP)

(72) Inventor: Ryota Morinaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 461 days.

(21) Appl. No.: 17/909,903

(22) PCT Filed: Feb. 9, 2021

(86) PCT No.: PCT/JP2021/004761
§ 371 (c)(1),
(2) Date: Sep. 7, 2022

(87) PCT Pub. No.: WO2021/181981
PCT Pub. Date: Sep. 16, 2021

(65) Prior Publication Data
US 2023/0184891 A1　　Jun. 15, 2023

(30) Foreign Application Priority Data

Mar. 10, 2020　(JP) ................................. 2020-041167

(51) Int. Cl.
*G01S 7/40*　　　　(2006.01)
*G01S 13/91*　　　(2006.01)
(52) U.S. Cl.
CPC .............. *G01S 7/4091* (2021.05); *G01S 7/40* (2013.01); *G01S 13/91* (2013.01)

(58) Field of Classification Search
CPC .......... G01S 7/4091; G01S 7/40; G01S 13/91; G01S 7/4095
See application file for complete search history.

(56) References Cited

U.S. PATENT DOCUMENTS

| | | | | |
|---|---|---|---|---|
| 10,514,455 B2 * | 12/2019 | Fujioka | ................. | G01S 13/582 |
| 2014/0240167 A1 * | 8/2014 | Cho | ........................ | G08G 1/052 |
| | | | | 342/104 |
| 2015/0280326 A1 * | 10/2015 | Arii | ........................ | H01Q 15/16 |
| | | | | 343/912 |
| 2016/0341823 A1 * | 11/2016 | Miller | ...................... | H01Q 3/02 |
| 2018/0106889 A1 * | 4/2018 | Schuck | ................. | G01S 13/886 |

(Continued)

FOREIGN PATENT DOCUMENTS

| | | |
|---|---|---|
| JP | 2004-239629 A | 8/2004 |
| JP | 2004-325113 A | 11/2004 |

(Continued)

*Primary Examiner* — William Kelleher
*Assistant Examiner* — Juliana Cross
(74) *Attorney, Agent, or Firm* — Oliff PLC

(57) ABSTRACT

A method of the present disclosure is a method of adjusting a radio wave sensor configured to transmit a radio wave to a reference object including a reflection portion and receive a reflected wave which is the radio wave reflected by the reflection portion. The method includes at least one of moving the reference object or moving the reflection portion, to cause a temporal change in detection data obtained from the reflected wave; and distinguishing the reflected wave and noise from each other by using the temporal change in the detection data.

13 Claims, 18 Drawing Sheets

(56) References Cited

U.S. PATENT DOCUMENTS

| | | | | |
|---|---|---|---|---|
| 2020/0064784 A1* | 2/2020 | Steiner | .................... | G01S 13/34 |
| 2020/0408898 A1* | 12/2020 | Kiuru | .................... | G01S 7/4008 |
| 2021/0096215 A1* | 4/2021 | Slobodyanyuk | ........ | H04W 4/38 |
| 2021/0190908 A1* | 6/2021 | Mikhailov | ............ | B64U 10/14 |

FOREIGN PATENT DOCUMENTS

| | | | |
|---|---|---|---|
| JP | 2005-098897 A | 4/2005 |
| JP | 2007-248058 A | 9/2007 |
| JP | 2010-190826 A | 9/2010 |
| JP | 2015-197410 A | 11/2015 |
| JP | 2017-090078 A | 5/2017 |
| JP | 2017-090138 A | 5/2017 |
| JP | 2017-194385 A | 10/2017 |
| JP | 2018-162977 A | 10/2018 |

* cited by examiner

FIG. 18

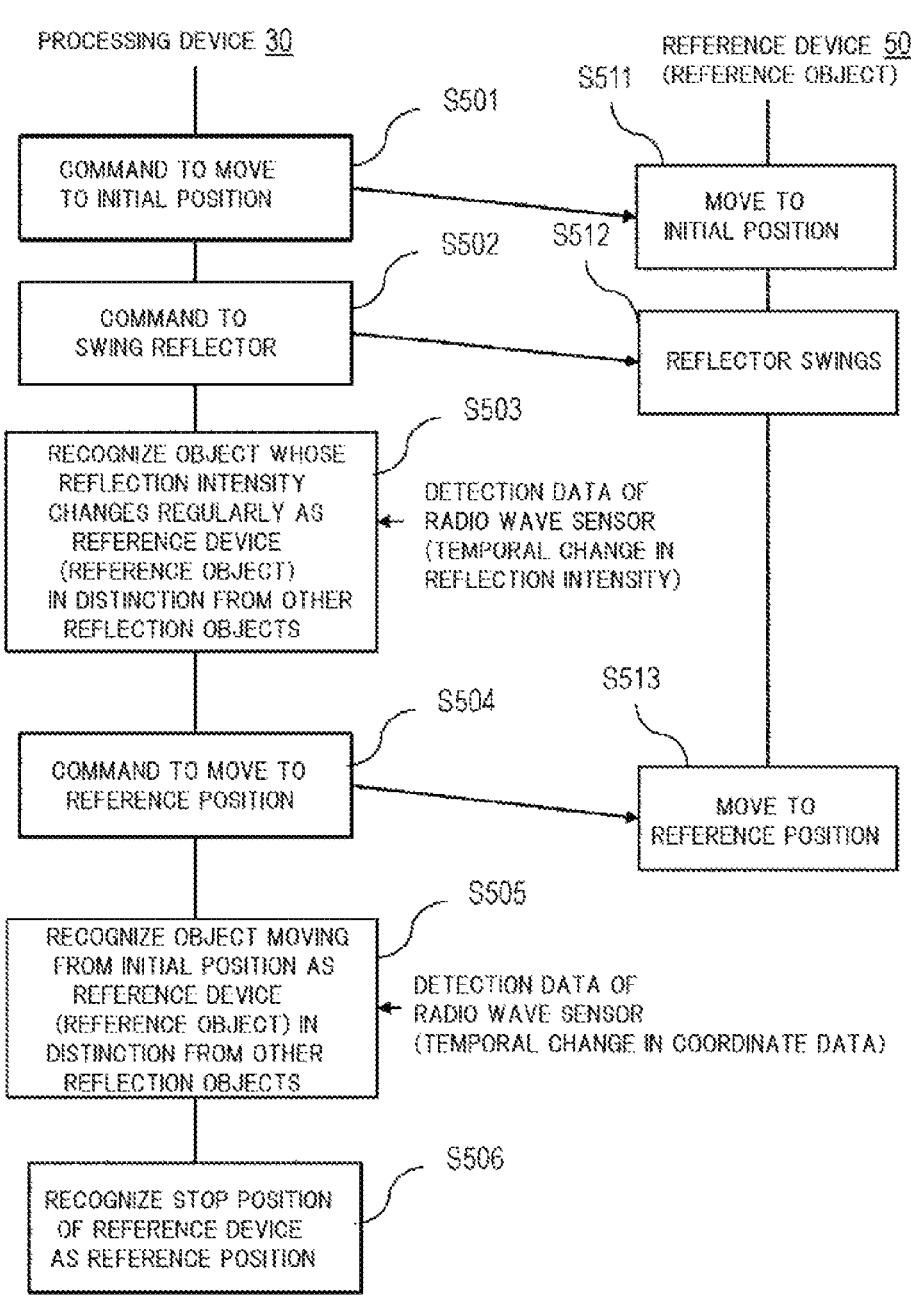

PROCESSING DEVICE 30

REFERENCE DEVICE 50
(REFERENCE OBJECT)

S501
COMMAND TO MOVE
TO INITIAL POSITION

S511
MOVE TO
INITIAL POSITION

S502
COMMAND TO
SWING REFLECTOR

S512
REFLECTOR SWINGS

S503
RECOGNIZE OBJECT WHOSE
REFLECTION INTENSITY
CHANGES REGULARLY AS
REFERENCE DEVICE
(REFERENCE OBJECT)
IN DISTINCTION FROM OTHER
REFLECTION OBJECTS

DETECTION DATA OF
RADIO WAVE SENSOR
(TEMPORAL CHANGE IN
REFLECTION INTENSITY)

S504
COMMAND TO MOVE TO
REFERENCE POSITION

S513
MOVE TO
REFERENCE POSITION

S505
RECOGNIZE OBJECT MOVING
FROM INITIAL POSITION AS
REFERENCE DEVICE
(REFERENCE OBJECT) IN
DISTINCTION FROM OTHER
REFLECTION OBJECTS

DETECTION DATA OF
RADIO WAVE SENSOR
(TEMPORAL CHANGE IN COORDINATE DATA)

S506
RECOGNIZE STOP POSITION
OF REFERENCE DEVICE
AS REFERENCE POSITION

METHOD OF ADJUSTING RADIO WAVE SENSOR, PROCESSING DEVICE, AND COMPUTER PROGRAM

TECHNICAL FIELD

The present disclosure relates to a method of adjusting a radio wave sensor, a processing device, and a computer program. This application claims priority based on Japanese Patent Application No. 2020-041167 filed on Mar. 10, 2020, and the entire contents of which are incorporated herein by reference.

BACKGROUND ART

Patent Literature 1 (PTL 1) discloses a radio wave sensor that radiates a radio wave to a target area set so as to include a crosswalk and detects an object. Patent Literature 2 (PTL 2) discloses that a direction of a reference object that is installed in a target area set so as to include a crosswalk is measured to recognize a misdirection of a radio wave sensor.

CITATION LIST

Patent Literature

PTL 1: Japanese Unexamined Patent Application Publication No. 2017-090138
PTL 2: Japanese Unexamined Patent Application Publication No. 2018-162977

SUMMARY OF INVENTION

One aspect of the present disclosure is a method of adjusting a radio wave sensor. The method according to the present disclosure is a method of adjusting a radio wave sensor configured to transmit a radio wave to a reference object including a reflection portion and receive a reflected wave which is the radio wave reflected by the reflection portion. The method includes at least one of moving the reference object or moving the reflection portion, to cause a temporal change in detection data obtained from the reflected wave; and distinguishing the reflected wave and noise from each other by using the temporal change in the detection data.

Another aspect of the present disclosure is a processing device. The processing device according to the present disclosure is to be used for a method of adjusting a radio wave sensor. The method includes at least one of moving a reference object including a reflection portion or moving the reflection portion, to cause a temporal change in detection data obtained from a reflected wave which is a radio wave transmitted to the reference object and reflected by the reflection portion. The processing device includes a determination unit configured to distinguish the reflected wave and noise from each other by using the temporal change in the detection data.

Another aspect of the present disclosure is a computer program. The computer program according to the present disclosure is a computer program for operating a computer serving as a processing device that is to be used for a method of adjusting a radio wave sensor. The method includes at least one of moving a reference object including a reflection portion or moving the reflection portion, to cause a temporal change in detection data obtained from a reflected wave which is a radio wave transmitted to the reference object and reflected by the reflection portion. The computer program causes the computer to execute processing of distinguishing the reflected wave and noise from each other by using the temporal change in the detection data.

BRIEF DESCRIPTION OF DRAWINGS

FIG. 18 is a flow chart of the third example.

DETAILED DESCRIPTION

Figure 1:
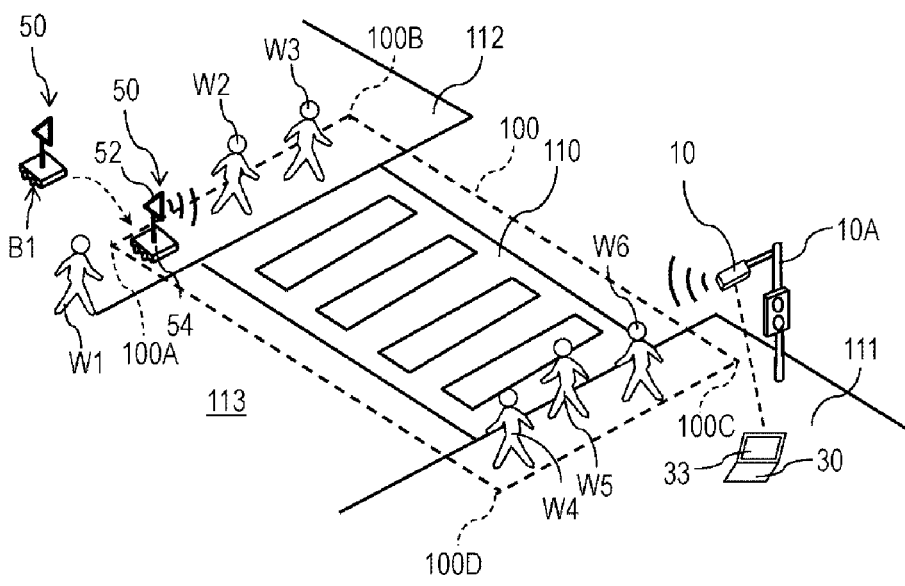
FIG. 1 is a diagram of a radio wave sensor and a crosswalk in a vicinity of the radio wave sensor.

Problems to be Solved by Present Disclosure

As disclosed in PTL 2, when a direction or the like of a radio wave sensor is adjusted, a reference object is installed at a predetermined position such as a reference position. The reference object is detected by the radio wave sensor to adjust the radio wave sensor. However, in a situation where an object other than the reference object exists in a vicinity of the position where the reference object is installed, the radio wave sensor receives not only a reflected wave from the reference object but also a reflected wave (noise) from another object. Therefore, it may be difficult to distinguish the reference object and objects other than the reference object from each other. That is, it may be difficult to distinguish the reflected wave from the reference object and noise from each other.

For example, when a target area includes a crosswalk and many pedestrians exist on the crosswalk, even if a reference object is installed at a reference position where the reference object is to be installed, many pedestrians exist at positions other than the reference position. Therefore, it is difficult to recognize which object is the reference object among many objects detected by the radio wave sensor. If the reference object cannot be recognized in distinction from other objects, for example, coordinates corresponding to the reference position where the reference object is installed in a coordinate system of a radio wave sensor cannot be obtained.

Therefore, when a radio wave sensor is adjusted based on a radio wave reflected by a reference object, it is desirable to facilitate distinguishing a reflected wave and noise from each other.

Advantageous Effects of Present Disclosure

According to the present disclosure, when a radio wave sensor is adjusted based on a radio wave reflected by a reference object, it is easy to distinguish the reflected wave and noise from each other.

Description of Embodiments of Present Disclosure (1) A method according to an embodiment is a method of adjusting a radio wave sensor configured to transmit a radio wave to a reference object including a reflection portion and receive a reflected wave which is the radio wave reflected by the reflection portion. The method includes at least one of moving the reference object or moving the reflection portion, to cause a temporal change in detection data obtained from the reflected wave; and distinguishing the reflected wave and noise from each other by using the temporal change in the detection data. In this case, since a temporal change in accordance with the motion of the reference object or the reflection portion occurs in the detection data obtained from the reflected wave, it is easy to distinguish the reflected wave and noise from each other.

(2) The moving of the reference object or the moving of the reflection portion may include moving the reference object or the reflection portion to cause a temporal change in at least one of a radio wave intensity of the reflected wave or a phase of the reflected wave. In this case, the reflected wave and the noise can be distinguished from each other by using the temporal change in the radio wave intensity or the phase.

(3) The moving of the reflection portion may include periodically moving the reflection portion. In this case, the temporal change in the detection data is also periodic, and thus it is easy to distinguish the reflected wave and noise from each other.

(4) The moving of the reflection portion may include moving the reflection portion while maintaining a position of the reference object. In this case, the reflected wave and noise can be distinguished from each other by using the motion in which the position is maintained.

(5) The moving of the reference object may include moving the reference object to change a position of the reference object. In this case, the reflected wave and noise can be distinguished from each other by using the change in position.

(6) The method according to the embodiment may include the moving of the reference object and the moving of the reflection portion. The moving of the reflection portion may include moving the reflection portion while maintaining a position of the reference object. The moving of the reference object may include moving the reference object to change the position of the reference object. In this case, the reflected wave and noise can be distinguished from each other by using both of the motion in which the position is maintained and the change in position.

(7) In the method according to the embodiment, the reflection portion may be moved while the position of the reference object is maintained, and then the reference object may be moved to change the position of the reference object. In this case, the reflected wave and noise are distinguished from each other by using the motion in which the position is maintained, and furthermore, the reflected wave and the noise can be reliably distinguished from each other by using the change in position.

(8) The moving of the reflection portion while maintaining the position of the reference object may include moving the reflection portion at a reference position, and the reference position may be a position at which the reference object is installed for adjusting the radio wave sensor. In this case, recognizing the reference object allows the reference position to be recognized.

(9) The moving of the reference object to change the position of the reference object may include moving the reference object to a reference position from a position other than the reference position, and the reference position may be a position at which the reference object is installed for adjusting the radio wave sensor. In this case, the moving of the reference object allows the reference position to be recognized.

(10) The method according to the embodiment may further include outputting the temporal change in the detection data. The output may be, for example, a display on a display or an output of sound. By outputting the temporal change in the detection data, an operator can recognize the temporal change in the detection data.

(11) The detection data may include at least one selected from the group consisting of data indicating a radio wave intensity of the reflected wave, data indicating a phase of the reflected wave, and data indicating a position of the reference object. In this case, these data are used to distinguish the reflected wave and noise from each other.

(12) The distinguishing of the reflected wave and the noise from each other may be performed by a processing device configured to execute processing of distinguishing the reflected wave and the noise from each other. In this case, the distinguishing can be efficiently performed by the processing device.

(13) The processing may include determining, by the processing device, whether the temporal change in the detection data is along a predetermined motion of the reference object or the reflection portion. In this case, it is easy to distinguish the reflected wave and noise from each other.

(14) A processing device according to an embodiment is to be used for a method of adjusting a radio wave sensor. The method includes at least one of moving a reference object including a reflection portion or moving the reflection portion, to cause a temporal change in detection data obtained from a reflected wave which is a radio wave transmitted to the reference object and reflected by the reflection portion. The processing device include a determination unit configured to distinguish the reflected wave and noise from each other by using the temporal change in the detection data.

(15) A computer program according to an embodiment is a computer program for operating a computer serving as a processing device that is to be used for a method of adjusting a radio wave sensor. The method includes at least one of moving a reference object including a reflection portion or moving the reflection portion, to cause a temporal change in detection data obtained from a reflected wave which is a radio wave transmitted to the reference object and reflected by the reflection portion. The computer program cause the computer to execute processing of distinguishing the reflected wave and noise from each other by using the temporal change in the detection data. The computer program is stored in a computer-readable, non-transitory storage medium.

Details of Embodiments of Present Disclosure

FIG. 1 illustrates a radio wave sensor 10 that is adjusted by an adjusting method according to an embodiment and a crosswalk 110 included in a target area 100 for detection by radio wave sensor 10. Note that target area 100 is not limited to an area including crosswalk 110.

Radio wave sensor 10 according to the embodiment is installed so as to detect an object in target area 100. Radio wave sensor 10 according to the embodiment is an infrastructure (road facility) that is installed on a road or a vicinity of the road, and detects an object such as a pedestrian. Radio wave sensor 10 is supported by an appropriate support member 10A such as a support pillar for a traffic signal unit and is installed at a relatively high place. Target area 100 is a range set to radio wave sensor 10 as a range in which an object needs to be detected among ranges in which radio wave sensor 10 can detect the object.

An object detected by radio wave sensor 10 is, for example, a pedestrian, a bicycle, a motorcycle, a guardrail, a utility pole, or a signboard. Target area 100 is set so as to include crosswalk 110 and parts of sidewalks 111 and 112. Crosswalk 110 is provided so as to connect sidewalks 111 and 112 to each other. Crosswalk 110 is provided so as to be across a roadway 113 situated between sidewalks 111 and 112. Sidewalks 111 and 112 included in target area 100 are areas adjacent to crosswalk 110, and are areas in which a pedestrian waits to cross crosswalk 110.

A shape of target area 100 is, for example, a quadrangle as shown in FIG. 1. Target area 100 with a quadrangular shape includes four area corners 100A, 100B, 100C, and 100D. The shape of target area 100 is not particularly limited. The shape of target area 100 is appropriately determined based on a shape of crosswalk 110, shapes of sidewalks 111 and 112, and a shape of roadway 113.

Figure 2:
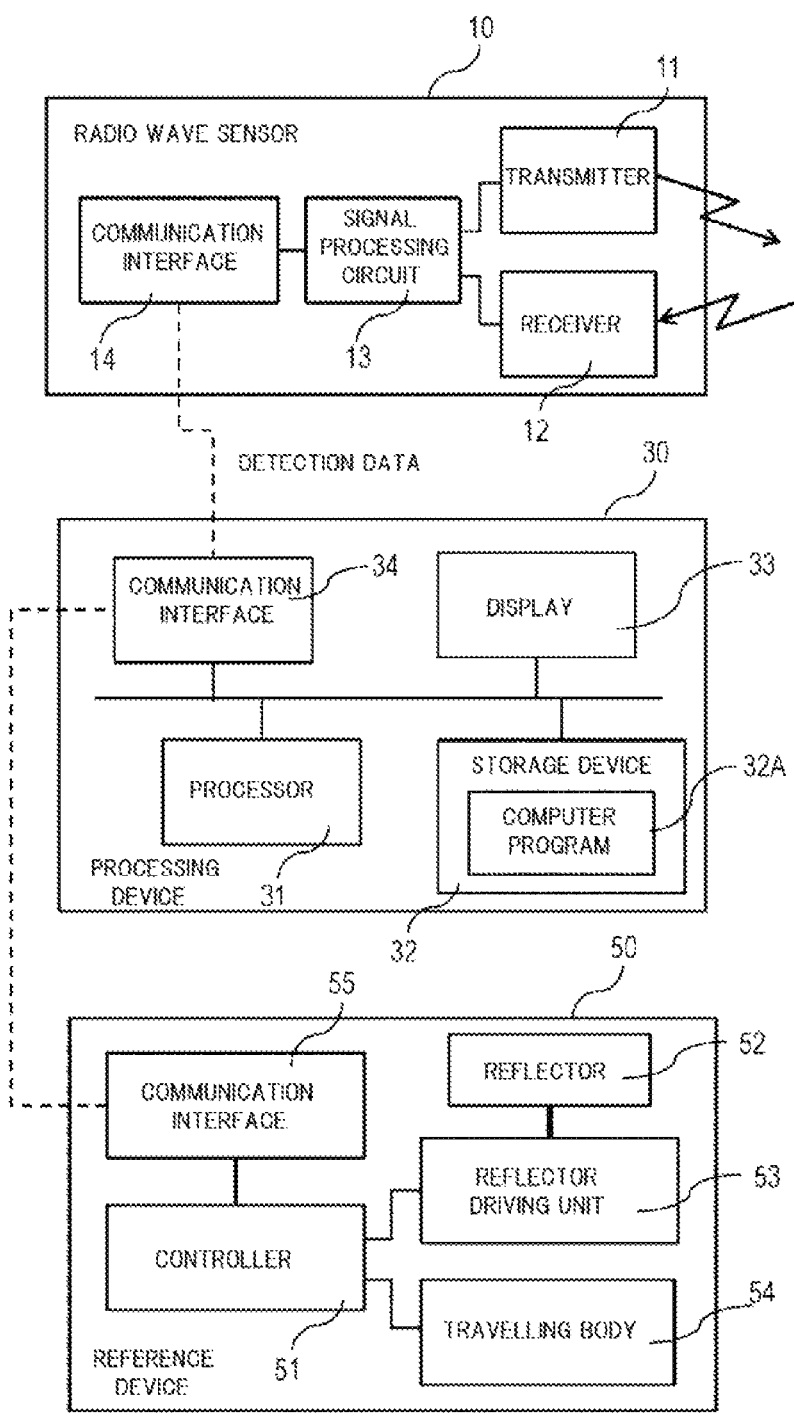
FIG. 2 is a block diagram of a radio wave sensor, a processing device, and a reference device.
Figure 3:
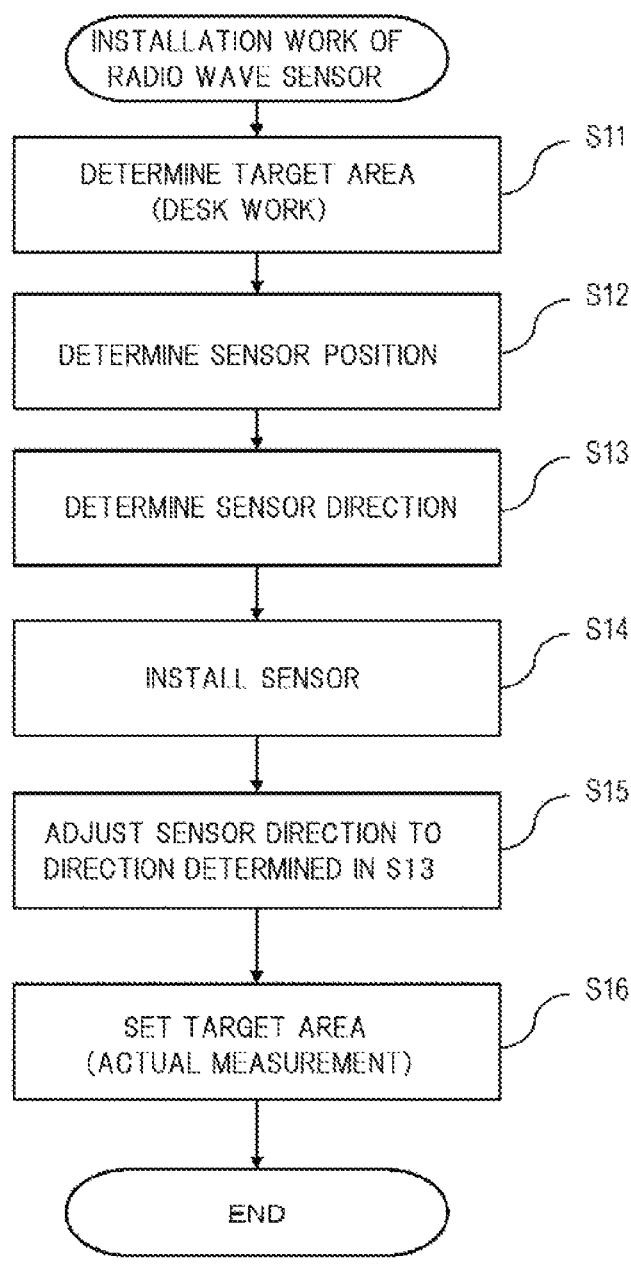
FIG. 3 is a flow chart of installation work of a radio wave sensor.

Radio wave sensor 10 according to the embodiment detects an object by transmitting a radio wave and receiving a reflected wave from the object. Radio wave sensor 10 according to the embodiment is, as an example, a millimeter-wave radar. As shown in FIG. 2, radio wave sensor 10 includes a transmitter 11 and a receiver 12.

Transmitter 11 has a transmission antenna and a transmission circuit, and transmits a signal as a radio wave for detecting an object. The signal to be transmitted is, for example, a frequency modulated continuous wave (FMCW). The transmitted signal is reflected by the object and becomes a reflected wave.

Receiver 12 has a reception antenna and a reception circuit, and receives the reflected wave from the object. Receiver 12 outputs a signal of the reflected wave to a signal processing circuit 13 included in radio wave sensor 10.

Signal processing circuit 13 generates detection data indicating a distance from radio wave sensor 10 to the object, a direction of the object with respect to radio wave sensor 10, a velocity of the object, an intensity of the reflected wave from the object, a phase of the reflected wave, and the like, based on the signal of the reflected wave. Radio wave sensor 10 can output the detection data to the outside of radio wave sensor 10 via a communication interface 14. Communication interface 14 is used for connection to an external device such as a processing device 30 described later. Communication interface 14 may be a wireless communication interface or a wired communication interface.

Processing device 30 is used to adjust radio wave sensor 10 during installation or maintenance of radio wave sensor 10. The adjustment of radio wave sensor 10 is, for example, an adjustment of a direction of radio wave sensor 10 or an adjustment of a setting of radio wave sensor 10. Processing device 30 receives the detection data of the object from radio wave sensor 10 to adjust radio wave sensor 10. Processing device 30 is used with being connected to radio wave sensor 10 so as to be communicatable with radio wave sensor 10 as an example, but may be included in radio wave sensor 10 itself.

As shown in FIG. 2, processing device 30 is configured by a computer including a processor 31 and a storage device 32 connected to processor 31. Storage device 32 according to the embodiment includes a primary storage device and a secondary storage device. The primary storage device is, for example, a random access memory (RAM) formed of a semiconductor memory. The secondary storage device is, for example, a hard disk drive or a solid state drive. In the present disclosure, storage device 32 may be referred to as a memory. Storage device 32 stores a computer program 32A for causing processor 31 to execute processing of adjusting radio wave sensor 10. Processor 31 reads computer program 32A from storage device 32 and executes computer program 32A, thereby executing processing of adjusting radio wave sensor 10. In the embodiment, the processing of adjusting radio wave sensor 10 includes processing based on the detection data obtained from radio wave sensor 10 and control processing of a reference device 50. The processing based on the detection data obtained from radio wave sensor 10 includes determination processing of distinguishing the reflected wave and noise from each other. Processor 31 that executes the determination processing operates as a determination unit 31A that distinguishes the reflected wave and noise from each other.

Processing device 30 includes a display 33 for presenting necessary information to an operator who operates processing device 30 to adjust radio wave sensor 10. Display 33 displays a screen used for adjusting radio wave sensor 10. In addition, processing device 30 includes a communication interface 34 for connection to external devices such as radio wave sensor 10 and reference device 50.

Reference device 50 is used as a reference object for adjusting radio wave sensor 10. When radio wave sensor 10 is adjusted, reference device 50 is installed at a predetermined position and detected by radio wave sensor 10. For detection by radio wave sensor 10, reference device 50 reflects a radio wave transmitted from radio wave sensor 10.

Reference device 50 includes a reflection portion whose motion (operation) is controlled by a controller 51. The reflection portion may be, for example, a reflector 52 or a module including reflector 52 as a component. Reflector 52 is formed of a member that efficiently reflects a radio wave. Since reference device 50 includes reflector 52, detection of reference device 50 by radio wave sensor 10 is facilitated. Reflector 52 is made of, for example, a metal. Reference device 50 includes a reflector driving unit 53 for driving reflector 52. The posture of reflector 52 is changed by reflector driving unit 53. Reflector driving unit 53 has, for example, a motor. The motor causes reflector 52 to swing, for example, but the motion of reflector 52 is not limited to a swinging motion The motion of reflector 52 is preferably a motion that causes an intensity of the reflected wave reaching radio wave sensor 10 to change over time. For example, in a case where reflector 52 has a reflection surface of a radio wave, the motion that causes the intensity of the reflected wave reaching radio wave sensor 10 to change over time is a motion in which the posture of the reflector changes between a posture in which the reflection surface directly faces radio wave sensor 10 and a posture in which the reflection surface does not directly face radio wave sensor 10.

Reference device 50 according to the embodiment includes a travelling body 54 for self-propelling. Travelling body 54 has wheels or endless tracks driven by a driving source such as an engine or a motor. The position (position coordinates on the road) of reflector 52 is changed by travelling body 54.

Controller 51 of reference device 50 controls the motion of reflector 52 and the motion (movement) of reference device 50 by travelling body 54. Reference device 50 receives a command from an external device such as processing device 30 and is remotely operated in accordance with the command. For communication with an external device, reference device 50 includes a communication interface 55. For example, when controller 51 of reference device 50 receives a command for a posture changing operation of reflector 52 from processing device 30, controller 51 controls the operation of reflector driving unit 53 in accordance with the command. When controller 51 receives a movement command from processing device 30, controller 51 causes travelling body 54 to travel in accordance with the command.

FIGS. 3 to 6 illustrate a procedure of installation work of radio wave sensor 10. First, in step S11 in FIG. 3, target area 100 is determined, and in step S12, an installation position of radio wave sensor 10 is determined. In step S13, an installation direction of radio wave sensor 10 is determined. Steps S11 to S13 are performed as desk work before the installation work of radio wave sensor 10.

Figure 4:
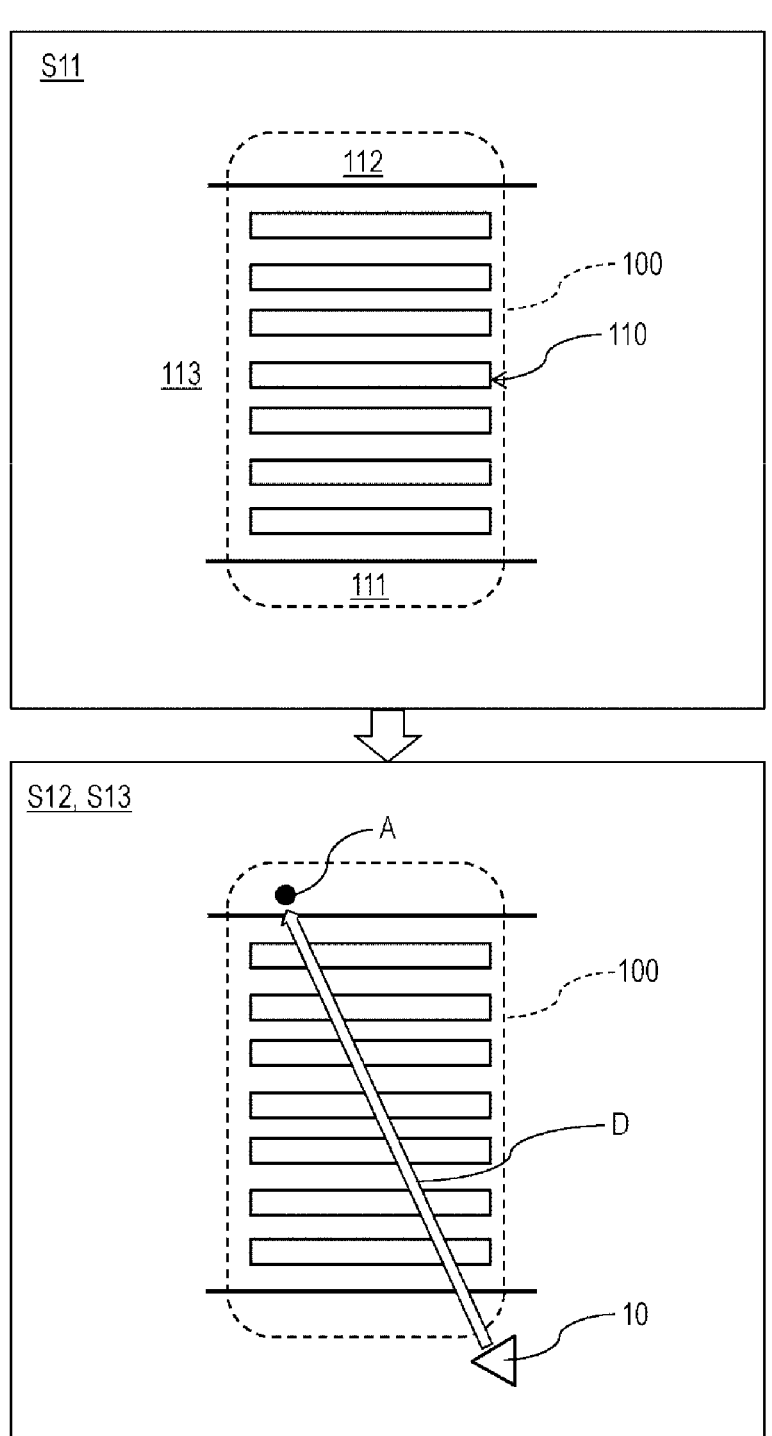
FIG. 4 is a diagram illustrating installation work of a radio wave sensor.

In step S11, a range to be target area 100 is appropriately determined based on a shape of crosswalk 110, shapes of sidewalks 111 and 112, and a shape of roadway 113 using a map or a satellite photo which include an installation position where radio wave sensor 10 is to be installed (see FIG. 4).

In subsequent step S12, the installation position of radio wave sensor 10 is determined in consideration of the presence of a member (such as a traffic signal unit) that can be support member 10A of radio wave sensor 10 (see FIG. 4). Furthermore, in step S13, an installation direction D (reference direction) of radio wave sensor 10 is determined based on directional characteristics of radio wave sensor 10 so that a reflected power in the entire target area 100 is high (see FIG. 4). With the determination of direction D of radio wave sensor 10, a reference position A is determined which lies in direction D in which radio wave sensor 10 is to face. When radio wave sensor 10 is installed in an installation place, the direction of radio wave sensor 10 is adjusted so that radio wave sensor 10 faces reference position A (see FIG. 4).

Figure 5:
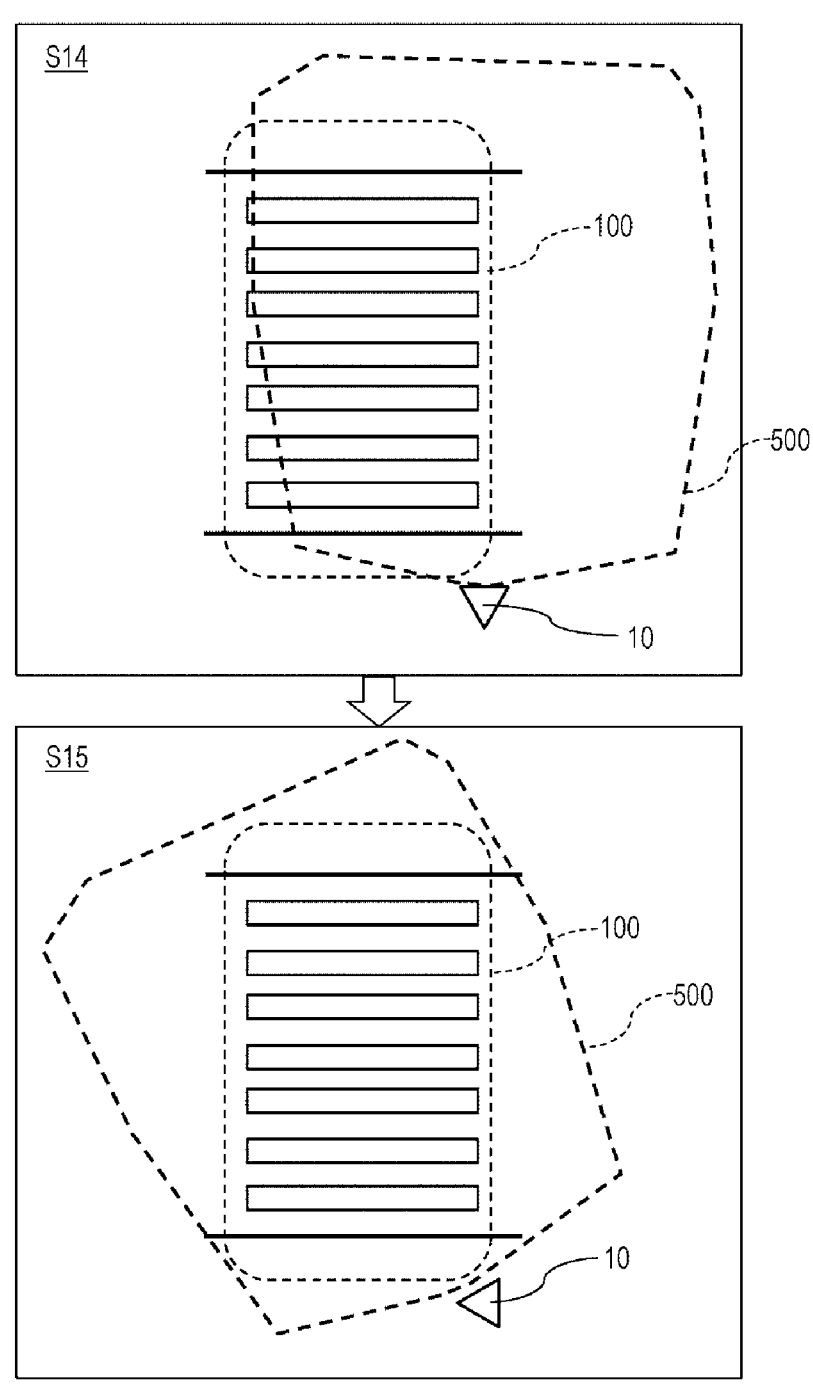
FIG. 5 is a diagram illustrating installation work of a radio wave sensor.

Step S14 and subsequent steps are performed in the installation place. In step S14, radio wave sensor 10 is installed at the installation position determined in step S12. Radio wave sensor 10 is mounted to support member 10A such as a support pillar of a traffic signal unit. At the time when the mounting of step S14 is completed, the direction of radio wave sensor 10 is not adjusted. Therefore, when step S14 is completed, as shown in FIG. 5, a detectable range 500 of radio wave sensor 10 may not cover the entire target area 100.

In step S15, the direction (angle) of radio wave sensor 10 is adjusted. The adjustment of the direction of radio wave sensor 10 includes at least one of an adjustment of a direction (angle) in a horizontal direction or an adjustment of a direction (angle) in a vertical direction of radio wave sensor 10. The adjustment in the horizontal direction is performed by an adjuster with rotating radio wave sensor 10 to the left or right so that radio wave sensor 10 faces toward reference direction D. With this adjustment, target area 100 falls within detectable range 500 of radio wave sensor 10. The adjustment in the vertical direction is performed by an adjuster with rotating the direction of radio wave sensor 10 up and down. The adjustment in the vertical direction is performed so that radio wave sensor 10 faces at a depression angle at which a reflected power from target area 100 is high.

In step S16, target area 100 is set in radio wave sensor 10. The setting of step S16 is performed using processing device 30 connected to radio wave sensor 10. In the setting of target area 100 in step S16, target area 100 determined in step S11 is set in a coordinate system of radio wave sensor 10 after the adjustment of the direction.

Figure 6:
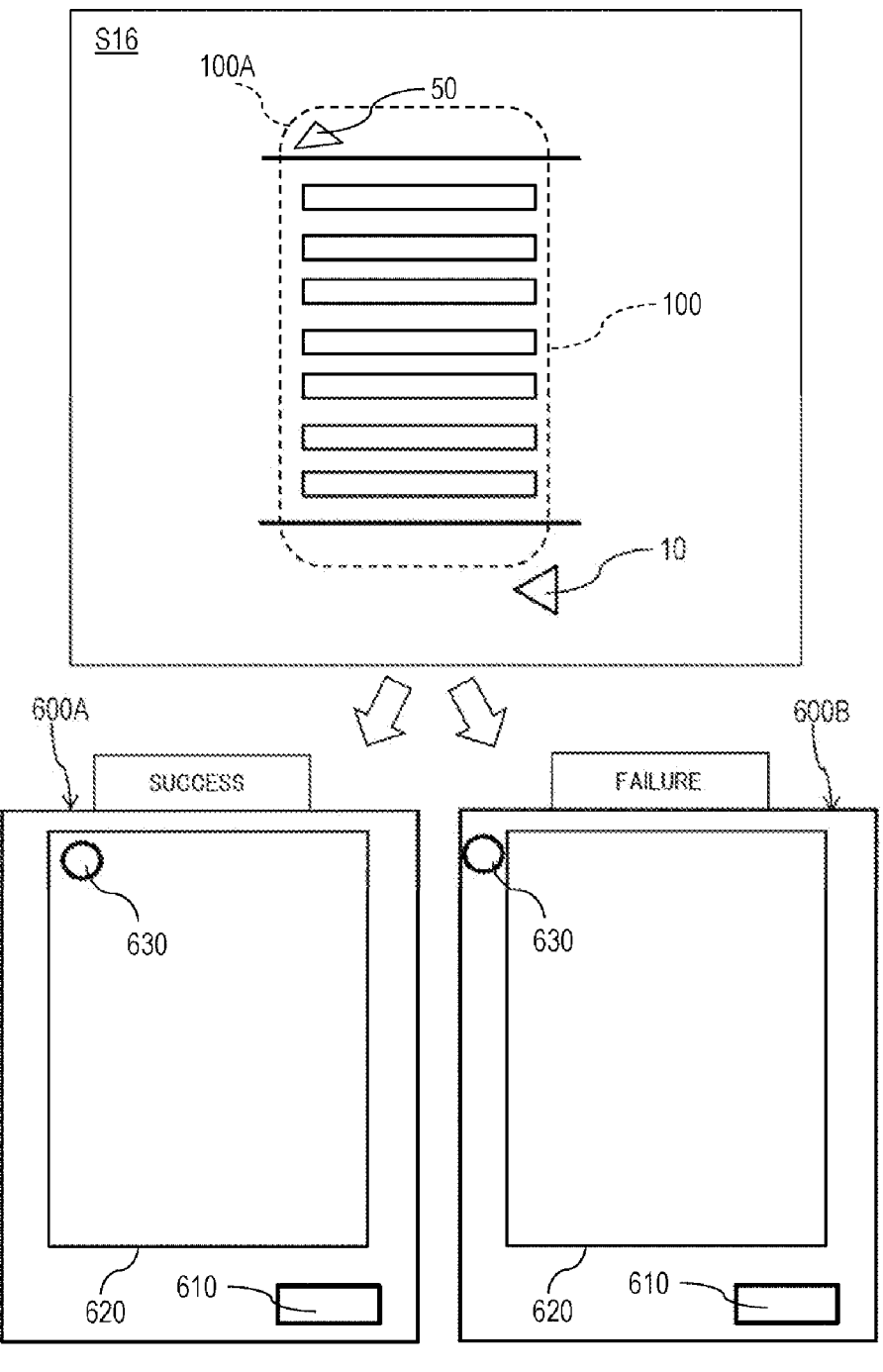
FIG. 6 is a diagram illustrating installation work of a radio wave sensor.

In order to confirm whether the setting of target area 100 has been correctly performed, as shown in FIG. 6, a reference object such as reference device 50 is installed in target area 100 and in a vicinity of area corner 100A (reference position). FIG. 6 also shows detection result screens 600A and 600B displayed on display 33 of processing device 30. Detection result screens 600A and 600B include a sensor display 610 indicating the position of radio wave sensor 10, a target area display 620 indicating target area 100, and a detected object display 630 indicating a detected object.

In a case where target area 100 is set correctly, detected object display 630 is located within target area display 620, as shown in screen 600A in FIG. 6. In this case, the setting of target area 100 is completed.

On the other hand, in a case where target area 100 is incorrectly set, detected object display 630 is located outside target area display 620 as shown in screen 600B in FIG. 6. In this case, it is necessary to reset target area 100. After resetting target area 100 by using processing device 30, the adjuster confirms again whether the setting of target area 100 has been correctly performed.

Figure 7:
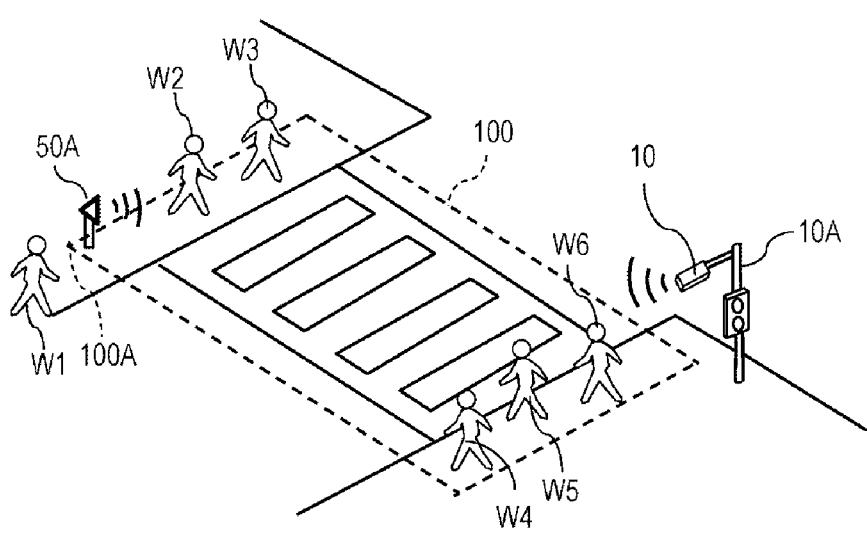
FIG. 7 is a diagram of a radio wave sensor and a crosswalk in a vicinity of the radio wave sensor.

In the adjustment of the direction of radio wave sensor 10 and the confirmation of the setting of target area 100 as described above, the reference object is disposed at a predetermined reference position (the reference position in FIG. 4, area corner 100A in FIG. 6 or the like). Then, radio wave sensor 100 detects the reference object installed at the reference position. However, in a case of crosswalk 110 in which many pedestrians exist, it is difficult to distinguish between pedestrians and the reference object. For example, as shown in FIG. 7, it is assumed that each of pedestrians W1, W2, W3, W4, W5, and W6 exists in target area 100 or in a vicinity of target area 100. In this situation, when reference object 50A including reflector 52 is installed at area corner 100A, reflected waves from pedestrians W1, W2, W3, W4, W5, and W6, and a reflected wave from reflector 52 may be detected in a same manner and may not be distinguished from each other. The reflected waves from the pedestrians become noise that makes it difficult to distinguish from the reflected wave from reflector 52. Note that not only a pedestrian but also a bicycle, a motorcycle, a guardrail, a signboard, an electric pole, and the like can be sources of noise generation.

Figure 8:
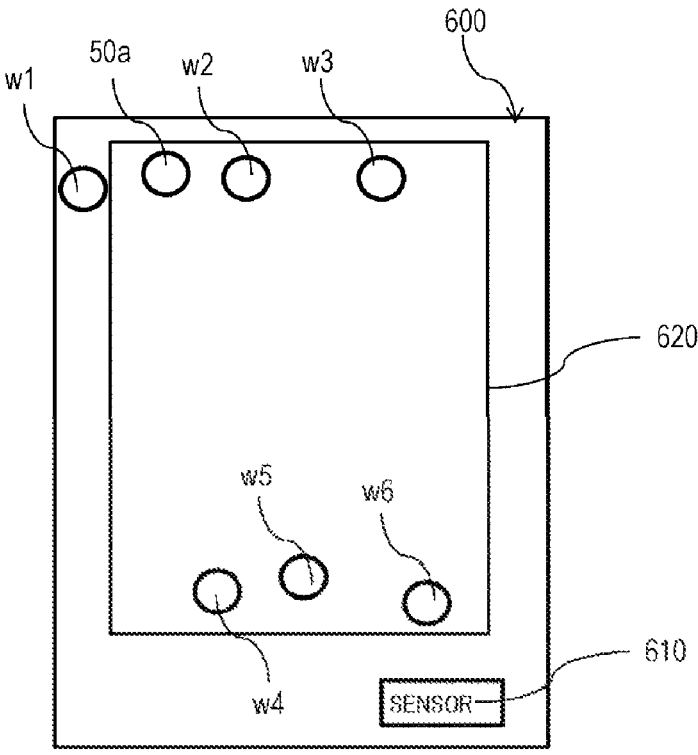
FIG. 8 is a diagram of detection result screen of a radio wave sensor.

FIG. 8 illustrates detection result screen 600 displayed on display 33 of processing device 30 when pedestrians W1, W2, W3, W4, W5, and W6, and reference object 50A exist as shown in FIG. 7. Detection results w1, w2, w3, w4, w5, and w6 in FIG. 8 correspond to pedestrians W1, W2, W3, W4, W5, and W6 in FIG. 7, respectively. Also, detection result 50a in FIG. 8 corresponds to reference object 50A in FIG. 7. Since both the pedestrians and the reference object are detected as some object on detection result screen 600, it may not be easy to distinguish between them.

Figure 9:
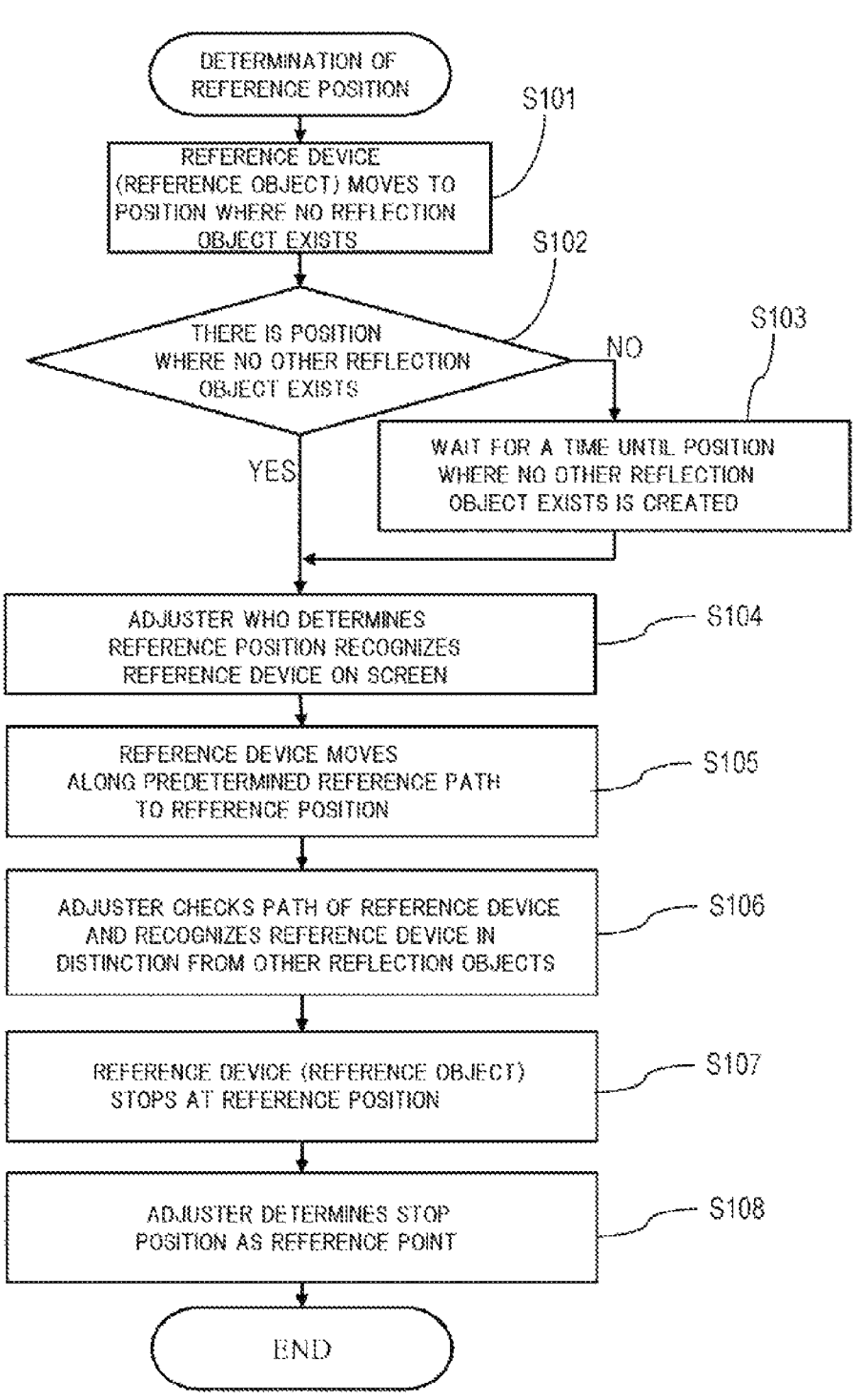
FIG. 9 is a flow chart of a first example.

FIG. 9 illustrates a first example of a method of distinguishing a pedestrian and a reference object from each other (a method of distinguishing noise which is a reflected wave from a pedestrian or the like, and a reflected wave from a reflector from each other). Here, as an example, reference device 50 according to the embodiment is used as the reference object, and the same applies to a second example and a third example to be described later. However, the reference object may be a person having a reflector. Here, as an example, a reference position at which reference device 50 is to be installed is area corner 100A of target area 100 shown in FIG. 7.

First, in step S101 in FIG. 9, reference device 50 (reference object) moves to a position B1 (initial position) away from area corner 100A which is the reference position. Position B1 is preferably a position where no other reflection object such as a pedestrian exists. In a case where position B1 is outside target area 100, there are fewer pedestrians and the like, and it is suitable. Position B1 is preferably within detectable range 500 of radio wave sensor 10. In other words, position B1 is preferably in a range that can be displayed on detection result screen 600.

When there is no position where no other object such as a pedestrian exists (step S102), reference device 50 waits for a time until a position where no other object exists is created (step S103). Reference device 50 moves to a position where no other object exists when the position where no other object exists is created.

When reference device 50 is located at area corner 100A which is the reference position, the adjuster who performs setting of the reference position refers to display 33 of processing device 30 and recognizes reference device 50 on screen 600 (step S104). At this time, since reference device 50 is located at position B1 away from area corner 100A which is the reference position, even if there is a pedestrian or the like near area corner 100A, the adjuster can easily distinguish the pedestrian and reference device 50 from each other on screen 600. That is, when detection results w1, w2, w3, w4, w5, and w6 of pedestrians are not present in a vicinity of detection result 50a indicating reference device 50 on screen 600, it is relatively easy to recognize the presence of reference device 50 on screen 600.

Figure 10:
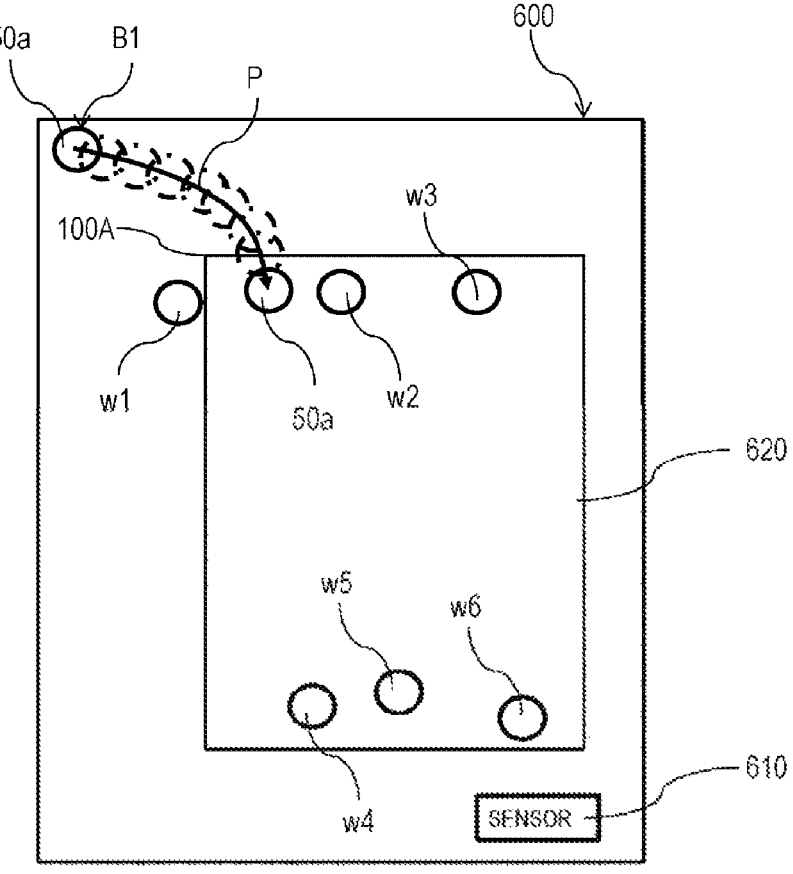
FIG. 10 is a diagram illustrating the first example.

Subsequently, reference device 50 moves to area corner 100A which is the reference position (step S105). Preferably, a movement route (reference path) of reference device 50 is predetermined. When reference device 50 moves, as shown in FIG. 10, detection result 50a indicating reference device 50 moves on screen 600. Thus, the adjuster can confirm a movement path P of reference device 50 on screen 600.

A motion of reference device 50 such as a movement facilitates distinguishing reference device 50 and a stationary object such as a utility pole from each other. Moreover, since reference device 50 performs a unique motion, reference device 50 can be easily distinguished from other moving objects such as pedestrians. For example, when a reference path along which reference device 50 moves is predetermined and the adjuster knows the reference path, the adjuster can easily recognize an object having movement path P along the reference path as reference device 50 (step S106). Accordingly, the adjuster can reliably distinguish reference device 50 and other objects such as pedestrians from each other.

Preferably, the reference path includes a path that is not normally taken by a pedestrian. The path that the pedestrian normally does not take is, for example, a meandering path of a pedestrian to area corner 100A that is the reference position. Since reference device 50 moves along the path that the pedestrian normally does not take, it is easy to distinguish reference device 50 and a pedestrian or the like from each other.

Note that a temporal change may occur in a phase of a reflected wave due to a movement of reference device 50. The adjuster may recognize reference device 50 based on the change in phase of the reflected wave. The change in phase of the reflected wave is preferably a change in phase having a regularity unique to reference device 50, which is different from a change in phase of a reflected wave from a pedestrian or the like. Furthermore, the adjuster may recognize reference device 50 based on an intensity of a reflected wave that changes in accordance with the change in phase of the reflected wave.

When reference device 50 reaches area corner 100A which is the reference position, reference device 50 stops at that position (step S107). When reference device 50 stops, the display of detection result 50a of reference device 50 on screen 600 also stops. Therefore, the adjuster can recognize the stop position of reference device 50 on screen 600 as the position coordinates (reference point) of the reference position in the coordinate system of radio wave sensor 10 (step S108). In this manner, the adjuster can easily determine that reference device 50 has reached the reference position by checking the movement path of reference device 50.

Figure 11:
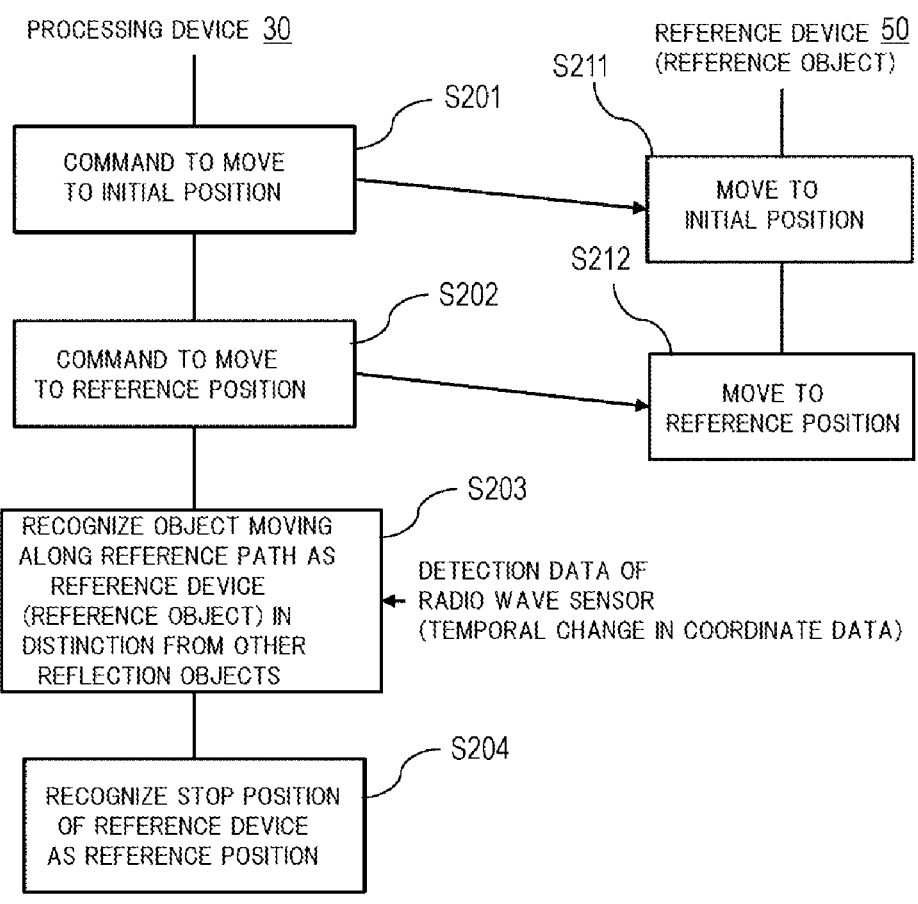
FIG. 11 is a flow chart of the first example.

FIG. 11 illustrates communication processing and information processing performed by processing device 30 and reference device 50 in the procedure shown in FIG. 9. First, processing device 30 transmits a first command to reference device 50 to move reference device 50 to initial position B1 (step S201). Upon receiving the first command, reference device 50 moves to initial position B1 (step S211). Reference device 50 may be installed at initial position B1 by the adjuster. Further, processor 31 of processing device 30 that transmits the first command functions as a command unit that transmits, to reference device 50 (reference object), a command to move the reference object so that a temporal change occurs in detection data obtained from a radio wave reflected by the reference object.

Subsequently, processing device 30 transmits a second command to reference device 50 to move reference device 50 to area corner 100A which is the reference position, (step S202). The second command may include data indicating a reference path from the initial position to the reference position. Upon receiving the second command, controller 51 of reference device 50 controls travelling body 54 to move reference device 50 to area corner 100A, which is the reference position, along the reference path (step S212). As reference device 50 moves, the coordinate position of reference device 50 detected by radio wave sensor 10 changes. Although reflector 52 does not move during the movement of reference device 50 in the present embodiment, reflector 52 may move. Furthermore, processor 31 of processing device 30 that transmits the second command functions as a command unit that transmits, to reference device 50 (reference object), a command to move the reference object so that the temporal change occurs in the detection data obtained from the radio wave reflected by the reference object.

In FIG. 11, processing device 30 executes processing of recognizing reference device 50 among objects detected by radio wave sensor 10 in distinction from other objects, and processing of recognizing the reference position. In order to recognize reference device 50, processing device 30 has data of a predetermined reference path (data indicating a reference motion of the reference object). Processing device 30 obtains detection data from radio wave sensor 10, and recognizes, as reference device 50, an object moving along the data of the reference path among the objects detected by radio wave sensor 10 (step S203). Since the detection data includes coordinate data of the detected objects, processing device 30 recognizes movement route P of each object based on a temporal change in coordinates indicated by the coordinate data. Then, processing device 30 compares the data of the reference path with the recognized movement route P, and recognizes the object moving along movement route P that is in accordance with the reference path as reference device 50. Note that processing device 30 may recognize reference device 50 by analyzing a temporal change in phase using phase data of the reflected wave included in the detection data. Further, reference device 50 may be recognized by the adjuster instead of processing device 30.

When reference device 50 stops at area corner 100A which is the reference position, processing device 30 recognizes the stop position as the reference position in the coordinate system of radio wave sensor 10 (step S204). In this manner, processing device 30 can easily recognize the reference position by recognizing movement path P of reference device 50. Note that the reference position may be recognized by the adjuster instead of processing device 30.

Figure 12:
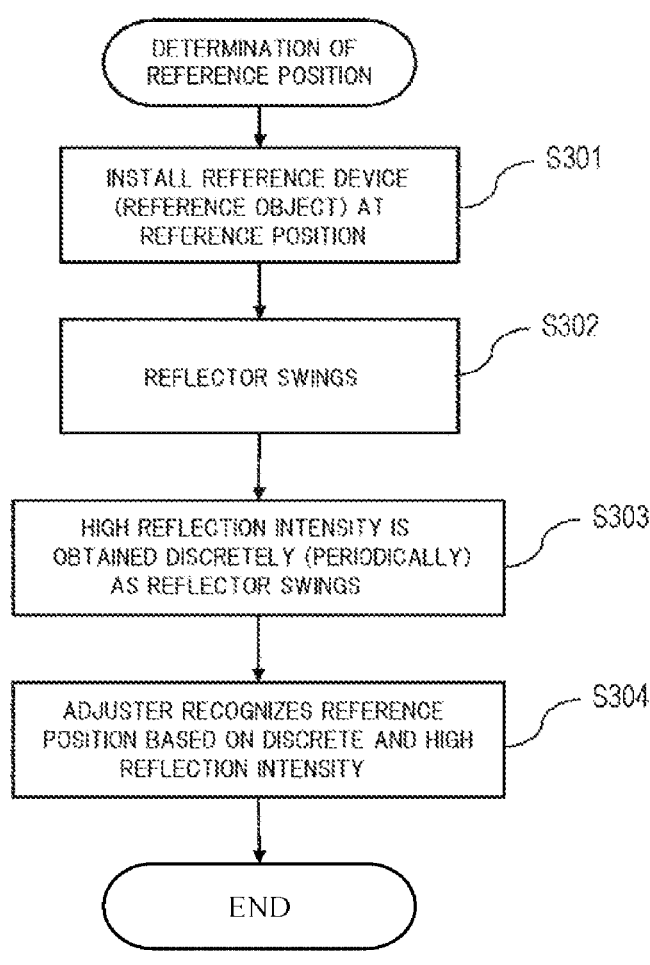
FIG. 12 is a flow chart of a second example.

FIG. 12 illustrates a second example of a method of distinguishing a pedestrian and a reference object from each other (a method of distinguishing noise which is a reflected wave from a pedestrian or the like, and a reflected wave from a reflector from each other). Also in this case, a reference position at which reference device 50 is to be installed is area corner 100A of target area 100.

In the second example, first, reference device 50 is installed at area corner 100A which is the reference position (step S301). Subsequently, reflector 52 moves at the reference position (step S302). The motion of reflector 52 here is, as an example, a swinging motion including a left-right motion or an up-down motion. The motion of reflector 52 may include a back-and-forth motion. Since travelling body 54 is stopped at the reference position during the swinging motion, the coordinate position (position in two dimensional coordinates on the road surface) of reference device 50 detected by radio wave sensor 10 is maintained.

As reflector 52 swings, a state in which a reflection surface of a radio wave of reflector 52 directly faces radio wave sensor 10 is discretely or periodically ensured. When the reflection surface of the radio wave of reflector 52 directly faces radio wave sensor 10, a high reflection intensity is obtained. Since the state in which the reflection surface of the radio wave of reflector 52 directly faces radio wave sensor 10 is discretely or periodically obtained by the swinging motion, the high reflection intensity is also discretely or periodically obtained (step S303).

Figure 13:
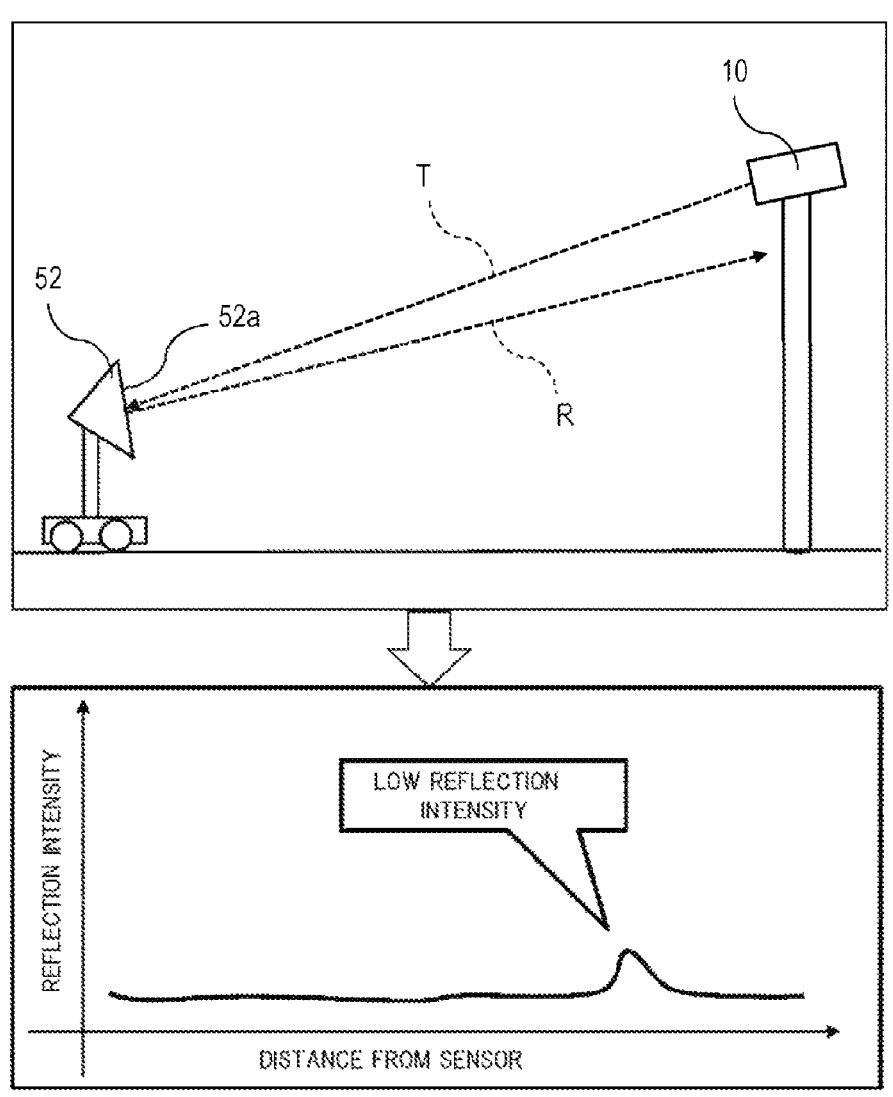
FIG. 13 is a diagram illustrating the second example.

As shown in FIG. 13, when reflector 52 is installed in a fixed manner, a reflection surface 52a of a radio wave of reflector 52 may not correctly face radio wave sensor 10. In this case, a reflected wave R of a transmitted wave T from radio wave sensor 10 has less components directed toward radio wave sensor 10. As a result, the intensity of reflected wave R detected by radio wave sensor 10 is lowered. Therefore, even if reflector 52 having a high reflection efficiency is used, a sufficiently high reflection intensity cannot be obtained, and it is difficult to distinguish the reference object and other objects such as pedestrians from each other. In addition, when reflector 52 is installed in a fixed manner, it is difficult to distinguish the reference object and a stationary object such as a utility pole from each other.

Figure 14:
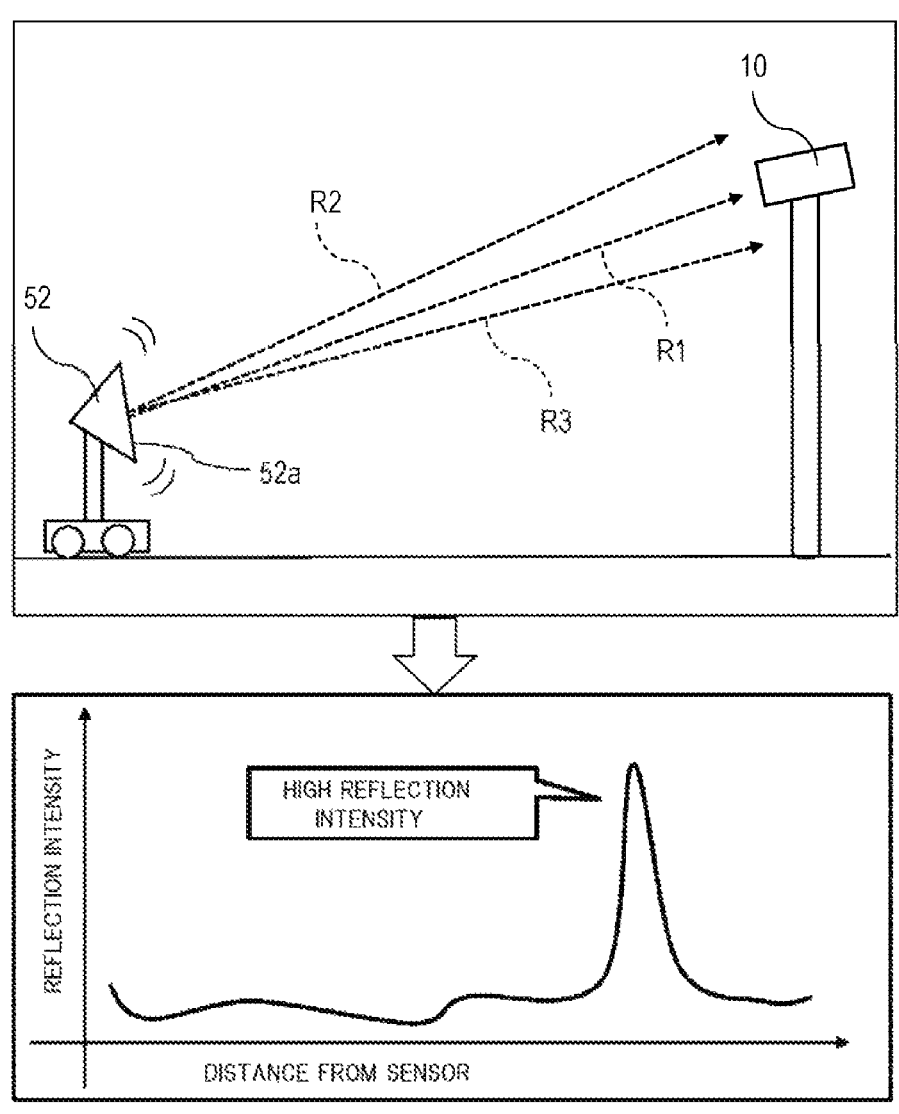
FIG. 14 is a diagram illustrating the second example.

On the other hand, when reflector 52 is swung as in the second example, as shown in FIG. 14, the state in which reflection surface 52a of reflector 52 directly faces radio wave sensor 10 is discretely or periodically ensured. During the swinging motion, intensities of reflected waves R2 and R3 in the state where reflection surface 52a directly faces radio wave sensor 10 are low, but an intensity of a reflected wave R1 in the state where reflection surface 52a directly faces radio wave sensor 10 is high. Therefore, the swinging motion of reflector 52 allows of obtaining a high reflection intensity in a discrete or periodical manner.

Figure 15:
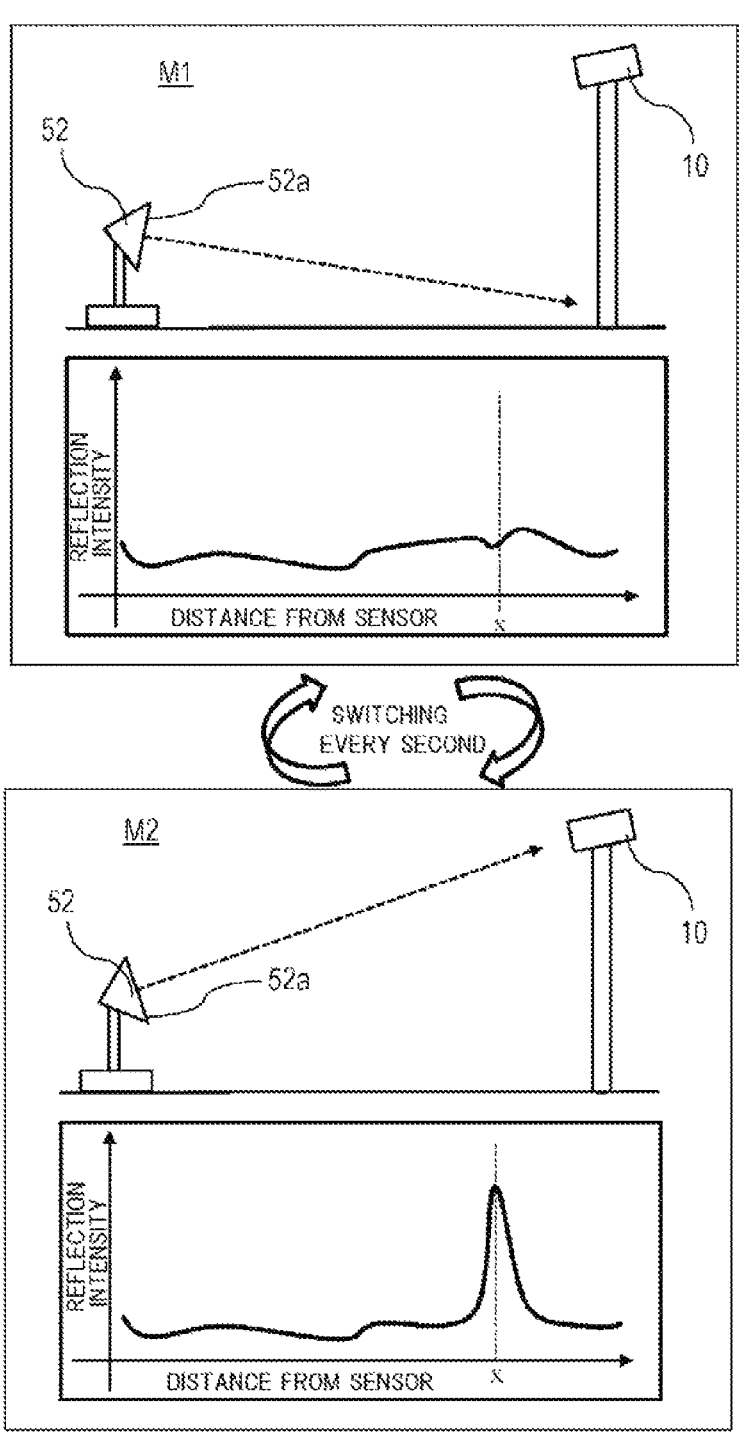
FIG. 15 is a diagram illustrating the second example.
Figure 16:
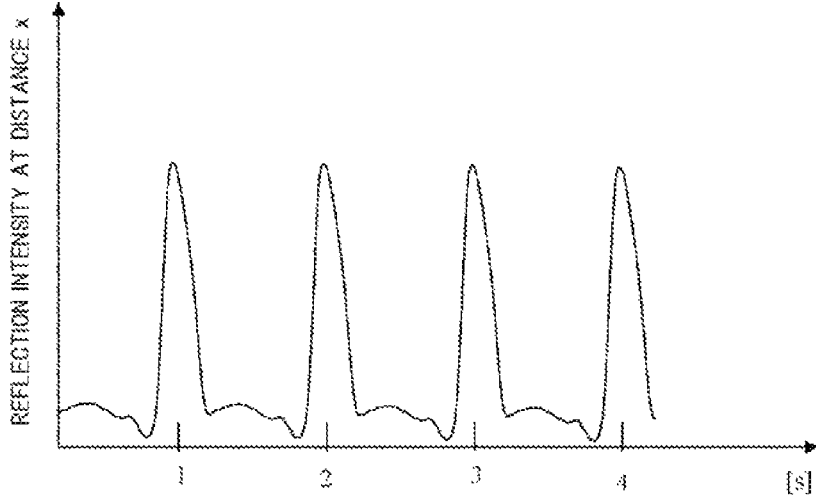
FIG. 16 is a diagram of a reflection intensity that changes periodically.

The motion of reflector 52 may be a random motion or a periodic motion that is regularly repeated. When the motion of reflector 52 is the periodic motion, the change in reflection intensity becomes periodic, thereby facilitating the recognition of reference device 50. FIG. 15 illustrates a situation in which reflector 52 moves so that a state M1 in which reflection surface 52a of reflector 52 does not directly face radio wave sensor 10 and a state M2 in which reflection surface 52a of reflector 52 directly faces radio wave sensor 10 are switched every second. In the situation where state M1 and state M2 are switched in a cycle of one second, as shown in FIG. 16, a high reflection intensity is obtained in a cycle of one second. Since a change pattern of the reflection intensity has a characteristic pattern which does not occur in a reflected wave from a normal pedestrian or the like, it is easy to recognize reference device 50 in distinction from a pedestrian. In addition, reference device 50 can be easily distinguished from a stationary object such as a utility pole by performing a motion such as a swinging motion.

The change in reflection intensity is displayed on screen 600 so as to be visually recognized by the adjuster. Therefore, by referring to screen 600, the adjuster can distinguish an object whose reflection intensity changes along the motion of reflector 52 from other objects such as pedestrians and recognize the object as reference device 50. The adjuster can recognize the position of reference device 50 on screen 600 as the position coordinates of the reference coordinates in the coordinate system of radio wave sensor 10 (step S304).

A temporal change may occur in a phase of the reflected wave due to the motion of reflector 52. Accordingly, the change in phase may be displayed on screen 600, and reference device 50 may be recognized based on the change in phase.

Figure 17:
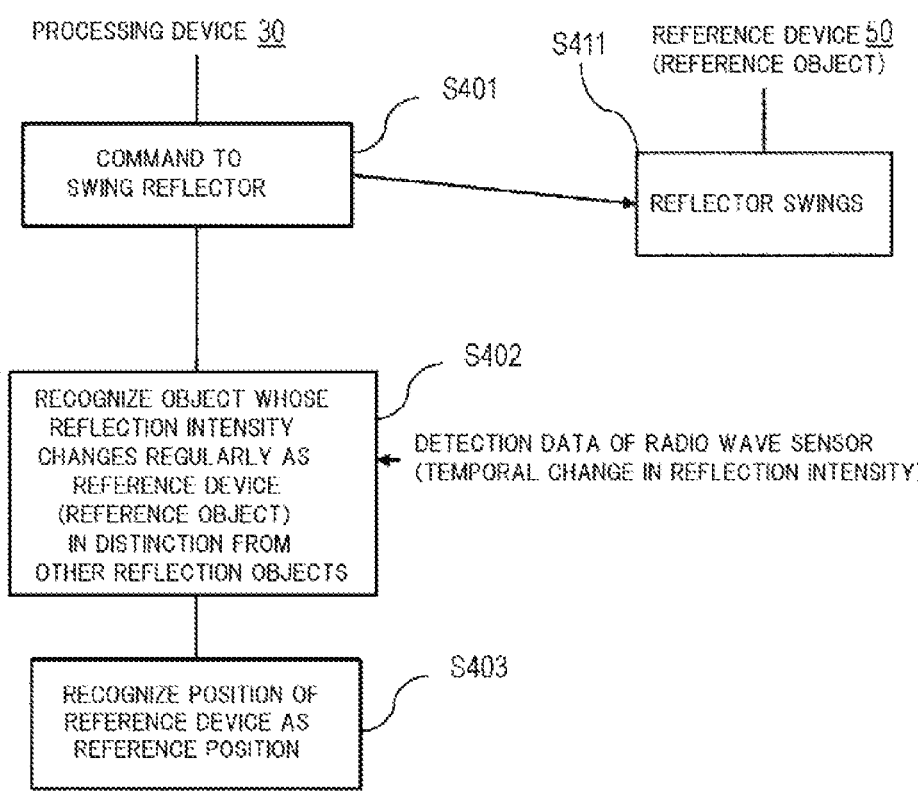
FIG. 17 is a flow chart of the second example.

FIG. 17 illustrates communication processing and information processing performed by processing device 30 and reference device 50 in the procedure shown in FIG. 12. Here, it is assumed that reference device 50 is installed at area corner 100A, which is the reference position, in advance. Processing device 30 transmits a command to reference device 50 to swing reflector 52 (step S401). Upon receiving this command, controller 51 of reference device 50 controls reflector driving unit 53 to cause reflector 52 to move in a manner such as a swinging motion (step S411).

In FIG. 17, processing device 30 executes processing of recognizing reference device 50 among objects detected by radio wave sensor 10 in distinction from other objects, and processing of recognizing the reference position. In order to recognize reference device 50, processing device 30 has data indicating a predetermined pattern of the motion of reflector 52 (data indicating a reference motion of the reference object). Processing device 30 obtains detection data from radio wave sensor 10, and recognizes, as reference device 50, an object moving along the data indicating the motion pattern of reflector 52 (for example, a regular motion) among the objects detected by radio wave sensor 10 (step S402). Since the detection data includes data of reflection intensities from the detected objects, processing device 30 can recognize reference device 50 in distinction from other objects such as pedestrians by analyzing a temporal change in reflection intensity. Note that reference device 50 may be recognized by analyzing the temporal change in phase using the data of the phase of the reflected wave included in the detection data.

Upon recognizing reference device 50, processing device 30 recognizes the position of reference device 50 as a reference position in the coordinate system of radio wave sensor 10 (step S403). In this manner, processing device 30 can easily recognize the reference position by analyzing the change pattern of the reflection intensity.

FIG. 18 illustrates a third example of a method of distinguishing a pedestrian and a reference object from each other (a method of distinguishing noise which is a reflected wave from a pedestrian or the like, and a reflected wave from a reflector from each other). Also in this case, a reference position at which reference device 50 is to be installed is area corner 100A of target area 100. The third example generally corresponds to a combination of the first example and the second example. With respect to points that are not specifically described in the third example, the descriptions of the first example and the second example are referred to.

First, processing device 30 transmits a first command to reference device 50 to move reference device 50 to initial position B1 (step S501). Upon receiving the first command, reference device 50 moves to initial position B1 (step S511). Subsequently, processing device 30 transmits a second command to reference device 50 to swing reflector 52 (step S502). When reference device 50 receives the second command, controller 51 of reference device 50 controls reflector driving unit 53 to cause reflector 52 to move in a manner such as a swinging motion (step S512). Processing device 30 obtains detection data from radio wave sensor 10, and recognizes reference device 50 based on a temporal change of a reflection intensity (step S503). Since the swinging motion of reference device 50 is performed at initial position B1, processing device 30 can easily recognize reference device 50 at initial position B1.

Subsequently, processing device 30 transmits a third command to reference device 50 to move reference device 50 to area corner 100A which is the reference position (step S504). The third command may include data indicating a reference path from initial position B1 to the reference position. When reference device 50 receives the third command, the controller 51 of reference device 50 controls travelling body 54 to move reference device 50 to area corner 100A, which is the reference position, along the reference path (step S513).

Processing device 30 obtains the detection data from radio wave sensor 10, and tracks and recognizes reference device 50 moving from initial position B1, based on coordinate data included in the detection data (step S505). In the third example, since reference device 50 is already recognized in distinction from other objects at the time when reference device 50 is located at initial position B1 (before moving to the reference position), processing device 30 can recognize a current position of reference device 50 by tracking an object moving from initial position B1.

When reference device 50 stops at area corner 100A, processing device 30 recognizes the position of area corner 100A as a reference position in the coordinate system of radio wave sensor 10 (step S506). Note that reference device 50 may further perform a swinging motion at the reference position.

As in the third example, since the motion of reference device 50 include both a movement of reference device 50 and a swinging motion of reflector 52, reference device 50 can be more easily recognized.

It should be understood that the embodiments disclosed herein are illustrative and non-restrictive in all aspects. The scope of the present invention is defined by the claims, not in the sense described above, and it is intended to embrace all modifications within the meaning and scope of equivalency of the claims

Additional Item

The present disclosure includes the following aspect.

A. A processing device is to be used for a method of adjusting a radio wave sensor. The method includes at least one of moving a reference object including a reflection portion or moving the reflection portion, to cause a temporal change in detection data obtained from a reflected wave which is a radio wave transmitted to the reference object and reflected by the reflection portion. The processing device includes a determination unit configured to distinguish the reflected wave and noise from each other by using the temporal change in the detection data. The determination unit is configured to distinguish the reflected wave and noise from each other by determining whether the temporal change in the detection data is along a predetermined motion of the reference object or the reflection portion.

REFERENCE SIGNS LIST 10 radio wave sensor; 10A support member; 11 transmitter; 12 receiver; 13 signal processing circuit; 14 communication interface; 30 processing device; 31 processor; 31A determination unit; 32 storage device; 32A computer program; 33 display; 34 communication interface; 50 reference device; 50A reference object; 50a detection result; 51 controller; 52 reflector; 52a reflection surface; 53 reflector driving unit; 54 travelling body; 55 communication interface; 100 target area; 100A area corner; 100B area corner; 100C area corner; 100D area corner; 110 crosswalk; 111 sidewalk; 112 sidewalk; 113 roadway; 500 detectable range; 600 detection result screen; 600A detection result screen; 600B detection result screen; 610 sensor display; 620 target area display; 630 detected object display; A reference position; B1 initial position; D reference direction; M1 state; M2 state; P movement path (movement route); R reflected wave; R1 reflected wave; R2 reflected wave; R3 reflected wave; T transmitted wave; W1 pedestrian; W2 pedestrian; W3 pedestrian; W4 pedestrian; W5 pedestrian; W6 pedestrian; w1 detection result; w2 detection result; w3 detection result; w4 detection result; w5 detection result; w6 detection result.

The invention claimed is:

1. A method of adjusting a radio wave sensor configured to transmit a radio wave to a reference object including a reflection portion and receive a reflected wave which is the radio wave reflected by the reflection portion, the method comprising:

at least one of moving the reference object or moving the reflection portion, to cause a temporal change in detection data obtained from the reflected wave;

determining whether a detected object is the reference object by:

(i) using the temporal change in the detection data to distinguish the reflected wave from noise; and (ii) determining whether the temporal change in the detection data indicates that at least one of the reference object or the reflection portion moved in a predetermined motion, wherein the method includes the moving of the reference object and the moving of the reference object includes moving the reference object to change a position of the reference object.

2. The method of adjusting a radio wave sensor according to claim 1, wherein the moving of the reference object or the moving of the reflection portion includes moving the reference object or the reflection portion to cause a temporal change in at least one of a radio wave intensity of the reflected wave or a phase of the reflected wave.

3. The method of adjusting a radio wave sensor according to claim 1, wherein the method includes the moving of the reflection portion and the moving of the reflection portion includes periodically moving the reflection portion.

4. The method of adjusting a radio wave sensor according to claim 1, wherein the method includes the moving of the reflection portion and the moving of the reflection portion includes moving the reflection portion while maintaining athe position of the reference object.

5. The method of adjusting a radio wave sensor according to claim 1, comprising the moving of the reflection portion, wherein the moving of the reflection portion includes moving the reflection portion while maintaining the position of the reference object, and the moving of the reference object includes moving the reference object to change the position of the reference object.

6. The method of adjusting a radio wave sensor according to claim 5, wherein the reflection portion is moved while the position of the reference object is maintained to identify the reference object, and then the reference object is moved to change the position of the reference object.

7. The method of adjusting a radio wave sensor according to claim 4, wherein the moving of the reflection portion while maintaining the position of the reference object includes moving the reflection portion at a reference position, and the reference position is a position at which the reference object is installed for adjusting the radio wave sensor.

8. The method of adjusting a radio wave sensor according to claim 1, wherein the moving of the reference object to change the position of the reference object includes moving the reference object to a reference position from a position other than the reference position, and the reference position is a position at which the reference object is installed for adjusting the radio wave sensor.

9. The method of adjusting a radio wave sensor according to claim 1, further comprising outputting the temporal change in the detection data.

10. The method of adjusting a radio wave sensor according to claim 1, wherein the detection data includes at least one selected from the group consisting of data indicating a radio wave intensity of the reflected wave, data indicating a phase of the reflected wave, and data indicating a position of the reference object.

11. The method of adjusting a radio wave sensor according to claim 1, wherein the distinguishing of the reflected wave and the noise from each other is performed by a processing device configured to execute processing of distinguishing the reflected wave and the noise from each other.

12. The method of adjusting a radio wave sensor according to claim 1, wherein the predetermined motion causes a periodic change in reflection intensity of the reflected wave from the reference object.

13. The method of adjusting a radio wave sensor according to claim 1, wherein the moving of the reference object to change the position of the reference object includes moving the reference object along a predetermined path.

* * * * *